(12) United States Patent
Byun et al.

(10) Patent No.: US 11,187,830 B2
(45) Date of Patent: Nov. 30, 2021

(54) POLARIZING PLATE, METHOD FOR MANUFACTURING POLARIZING PLATE, AND OPTICAL DISPLAY DEVICE COMPRISING SAME

(71) Applicant: SAMSUNG SDI CO., LTD., Yongin-si (KR)

(72) Inventors: Byung Joo Byun, Suwon-si (KR); Young Jong Kim, Suwon-si (KR); Do Heon Lee, Suwon-si (KR); In Cheon Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 208 days.

(21) Appl. No.: 16/482,683

(22) PCT Filed: Jan. 3, 2018

(86) PCT No.: PCT/KR2018/000080
§ 371 (c)(1),
(2) Date: Jul. 31, 2019

(87) PCT Pub. No.: WO2018/143569
PCT Pub. Date: Aug. 9, 2018

(65) Prior Publication Data
US 2019/0339421 A1 Nov. 7, 2019

(30) Foreign Application Priority Data
Feb. 1, 2017 (KR) .................. 10-2017-0014656

(51) Int. Cl.
*G02B 1/14* (2015.01)
*G02B 5/30* (2006.01)
(Continued)

(52) U.S. Cl.
CPC .............. *G02B 1/14* (2015.01); *B32B 7/12* (2013.01); *B32B 27/08* (2013.01); *B32B 27/18* (2013.01);
(Continued)

(58) Field of Classification Search
CPC .................................................. G02B 5/3025
See application file for complete search history.

(56) References Cited

U.S. PATENT DOCUMENTS

2013/0236149 A1* 9/2013 Hirayama ............... C08L 63/00
385/123

FOREIGN PATENT DOCUMENTS

JP      JR 2009-122796 A     6/2009
KR    10-2008-0066732 A    7/2008
(Continued)

OTHER PUBLICATIONS

Machine translation of Youn, KR20160037811 (Year: 2016).*

*Primary Examiner* — Ian A Rummel
(74) *Attorney, Agent, or Firm* — Lewis Roca Rothgerber Christie LLP

(57) ABSTRACT

Provided are: a polarizing plate; a method for manufacturing the polarizing plate; and an optical display device comprising the same, the polarizing plate having an adhesive layer, a barrier layer, a polarizer, and a protective film, which are sequentially stacked, wherein the barrier layer is formed from a barrier layer composition containing an epoxy-based compound and an antimony sulfonium-based initiator.

13 Claims, 1 Drawing Sheet

(51) Int. Cl.
  *B32B 7/12*  (2006.01)
  *B32B 27/08*  (2006.01)
  *B32B 27/38*  (2006.01)
  *B32B 27/18*  (2006.01)
  *B32B 27/36*  (2006.01)
  *B32B 27/32*  (2006.01)
  *G02B 1/04*  (2006.01)

(52) U.S. Cl.
  CPC .............. *B32B 27/32* (2013.01); *B32B 27/36* (2013.01); *B32B 27/38* (2013.01); *G02B 5/3025* (2013.01); *B32B 2250/04* (2013.01); *B32B 2307/42* (2013.01); *B32B 2307/732* (2013.01); *G02B 1/04* (2013.01)

(56) References Cited

FOREIGN PATENT DOCUMENTS

| | | |
|---|---|---|
| KR | 10-2010-0014521 A | 2/2010 |
| KR | 10-2015-0055013 A | 5/2015 |
| KR | 10-2016-0037811 A | 4/2016 |
| KR | 10-2016-0117870 A | 10/2016 |

\* cited by examiner

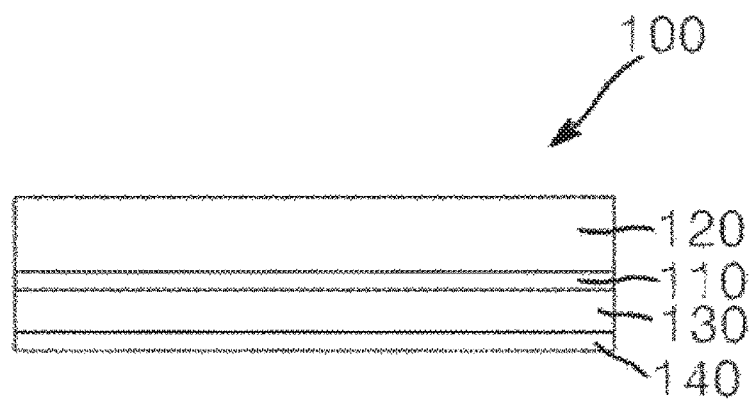

POLARIZING PLATE, METHOD FOR MANUFACTURING POLARIZING PLATE, AND OPTICAL DISPLAY DEVICE COMPRISING SAME

CROSS-REFERENCE TO RELATED APPLICATION(S)

This application is a U.S. National Phase Patent Application of International Application Number PCT/KR2018/000080, filed on Jan. 3, 2018, which claims priority of Korean Patent Application Number 10-2017-0014656, filed on Feb. 1, 2017, the entire contents of all of which are incorporated herein by reference.

TECHNICAL FIELD

The present invention relates to a polarizing plate, a method for manufacturing a polarizing plate, and an optical display including the same. More particularly, the present invention relates to a polarizing plate, which includes a barrier layer exhibiting good adherence to a polarizer and capable of preventing generation of cracks in the polarizer upon thermal impact, and formed of a barrier layer composition having low peel strength with respect to a process film after curing to allow the process film to be easily peeled off, thereby suppressing generation of cracks upon peeling, a method for manufacturing a polarizing plate, and an optical display including the same.

BACKGROUND ART

In a liquid crystal display, polarizing plates are necessarily provided to both sides of a glass substrate constituting a surface of a liquid crystal panel for formation of images. The polarizing plate generally includes a transparent protective film formed of a triacetylcellulose resin and bonded to one or both surfaces of a polarizer composed of a polyvinyl alcohol film and a dichroic material, such as iodine and the like, via a polyvinyl alcohol bonding agent to protect the polarizer. In addition, it becomes difficult to secure sufficient durability for the polarizing plate and there is a need for durability under severe conditions such as thermal impact under low temperature and high temperature conditions (see Japanese Unexamined Patent Publication No. 2006-220732).

On the other hand, although a polarizing plate including a transparent protective film disposed only on one surface of the polarizer is used in terms of slim structure, such a polarizing plate includes an adhesive layer formed on the other surface of the polarizer. However, such a thin adhesive type polarizing plate including the transparent protective film disposed only on one surface of the polarizer has poor durability and allows easy generation of cracks in a stretched direction (MD) of the polarizer under the severe conditions. Moreover, a polarizing plate including a protective layer formed on at least one side of a polarizer for thickness reduction is proposed in the art (see Japanese Unexamined Patent Publication No. 2009-122796).

DISCLOSURE

Technical Problem

It is one aspect of the present invention to provide a polarizing plate that includes a barrier layer exhibiting good adherence to a polarizer and capable of preventing generation of cracks in the polarizer upon thermal impact.

It is another aspect of the present invention to provide a polarizing plate that includes a barrier layer exhibiting good adherence to each of a polarizer and an adhesive layer at high temperature.

It is a further aspect of the present invention to provide a polarizing plate that includes a barrier layer formed of a barrier layer composition having low peel strength with respect to a process film after curing to allow the process film to be easily peeled off, thereby suppressing generation of cracks upon peeling.

It is yet another aspect of the present invention to provide a polarizing plate that includes a barrier layer not requiring use of a thioxanthone photo-enhancer to prevent a yellowing phenomenon.

It is yet another aspect of the present invention to provide a method for manufacturing a polarizing plate that includes a barrier layer formed of a barrier layer composition having low peel strength with respect to a process film after curing to allow the process film to be easily peeled off, thereby suppressing generation of cracks upon peeling.

Technical Solution

In accordance with one aspect of the present invention, a polarizing plate includes: an adhesive layer, a barrier layer, a polarizer, and a protective film sequentially stacked in the stated order, wherein the barrier layer is directly formed on the polarizer and is formed of a barrier layer composition including an epoxy compound and a sulfonium antimony-based initiator.

In accordance with another aspect of the present invention, a method for manufacturing a polarizing plate includes: depositing a barrier layer composition onto one surface of a polarizer, followed by attaching a process film thereto; and curing the barrier layer composition to form a barrier layer, followed by peeling the process film from the barrier layer, wherein peel strength between the barrier layer and the process film is about 40 gf/25 mm or less.

In accordance with a further aspect of the present invention, an optical display includes the polarizing plate according to the present invention.

Advantageous Effects

The present invention provides a polarizing plate that includes a barrier layer exhibiting good adherence to a polarizer and capable of preventing generation of cracks in the polarizer upon thermal impact.

The present invention provides a polarizing plate that includes a barrier layer exhibiting good adherence to each of a polarizer and an adhesive layer at high temperature.

The present invention provides a polarizing plate that includes a barrier layer formed of a barrier layer composition having low peel strength with respect to a process film after curing to allow the process film to be easily peeled off, thereby suppressing generation of cracks upon peeling.

The present invention provides a polarizing plate that includes a barrier layer not requiring use of a thioxanthone photo-enhancer to prevent a yellowing phenomenon.

The present invention provides a method for manufacturing a polarizing plate that includes a barrier layer formed of a barrier layer composition having low peel strength with respect to a process film after curing to allow the process film to be easily peeled off, thereby suppressing generation of cracks upon peeling.

BRIEF DESCRIPTION OF DRAWING

FIG. 1 is a sectional view of a polarizing plate according to one embodiment of the present invention.

BEST MODE

Hereinafter, embodiments of the present invention will be described with reference to the accompanying drawings. It should be understood that the present invention is not limited to the following embodiments and may be embodied in different ways. Further, it should be understood that the embodiments are provided for complete disclosure and thorough understanding of the present invention by those skilled in the art. In the drawings, thicknesses or widths of various components of each device may be exaggerated for convenience. Like components will be denoted by like reference numerals throughout the accompanying drawings.

As used herein, spatially relative terms such as "upper" and "lower" are defined with reference to the accompanying drawings. Thus, it will be understood that "upper" can be used interchangeably with "lower". It will be understood that when a layer is referred to as being "on" another layer, it can be directly formed on the other layer, or intervening layer(s) may also be present. Thus, it will be understood that when a layer is referred to as being "directly on" another layer, no intervening layer is interposed therebetween.

Herein, "yellow index" refers to a value measured in accordance with ASTM D1925.

Herein, for evaluation of peel strength with respect to a process film after curing a barrier layer composition, a sample was prepared by the following method. A stack of a protective film and a polarizer was prepared and the barrier layer composition was deposited onto one surface of the polarizer and a process film was attached to the barrier layer composition, followed by irradiation with UV light under conditions of 400 mW/cm$^2$ and 1,000 mJ/cm$^2$, thereby preparing a specimen, which in turn was cut to a size of 25 mm×150 mm (TD of the polarizer×MD of the polarizer). The polarizer bonded to the protective film and the process film were connected to upper and lower jigs of a tensile tester (Texture Analyzer), and peel strength was measured at 25° C. under a load cell of 30 kgf upon peeling of the process film at a rate of 5 mm/sec.

Herein, the term "glass transition temperature (Tg) in a homopolymer phase" may mean a glass transition temperature measured with respect to a homopolymer of a target monomer using a DSC Discovery (TA Instrument Inc.). Specifically, the homopolymer of the target monomer was heated to 200° C. at a rate of 20° C./min, slowly cooled to −180° C. at the same rate, and heated to 200° C. at a rate of 10° C./min in order to obtain an endothermic transition curve. An inflection point of the endothermic transition curve can be determined as the glass transition temperature.

Herein, "modulus" of an adhesive layer refers to storage modulus, as measured on a specimen in a dynamic mode (strain 5%, 1 Hz) at 25° C. using an advanced rheometry expansion system (ARES, TA Instrument). Here, for preparation of the specimen, an adhesive layer composition was coated onto a release film (for example, polyethylene terephthalate film) and was left for aging at 35° C. and 45% RH (relative humidity) to form a 25 μm thick adhesive film, which in turn was stacked plural times to prepare a 0.8 mm thick specimen.

Herein, the term "moisture permeability" is a value measured on a protective layer under conditions of 40° C. and 90% RH for 24 hours in accordance with KS A1013.

Herein, the term "(meth)acryl" refers to acryl and/or methacryl.

Hereinafter, a polarizing plate according to one embodiment of the present invention will be described with reference to FIG. 1. FIG. 1 is a sectional view of a polarizing plate according to one embodiment of the present invention.

Referring to FIG. 1, a polarizing plate 100 may include a polarizer 110, a protective film 120, a barrier layer 130, and an adhesive layer 140.

In the polarizing plate 100, the protective film 120, the polarizer 110, the barrier layer 130 and the adhesive layer 140 are sequentially stacked in the stated order, and the barrier layer 130 is directly formed on the polarizer 110 and the adhesive layer 140. Herein, the expression "directly formed on" means that another adhesive layer, another bonding layer, or another adhesive/bonding layer is not interposed between the barrier layer and the polarizer.

The barrier layer 130 may be formed of a barrier layer composition including an epoxy compound and a sulfonium antimony-based initiator. The present invention is based on the presence of a barrier layer, which can provide barrier effects and can exhibit good adherence to the polarizer while sufficiently preventing generation of cracks in the polarizer under thermal impact by containing the sulfonium antimony-based initiator in the barrier layer. In particular, thermal impact means repetition of 250 cycles in which 1 cycle refers to a cycle between −40° C. and 85° C. The barrier layer exhibits good adherence to the polarizer at both high temperature and low temperature and undergoes less variation in modulus to prevent generation of cracks in the polarizer even upon repeated cycles between low temperature and high temperature. Although it is not apparent how the sulfonium antimony-based initiator influences the aforementioned effects of the barrier layer, it is believed that these effects of the barrier layer are obtained through reaction between sulfonium, antimony, an epoxy compound, and a (meth)acrylate compound, without being limited thereto.

In addition, as described in detail below, the barrier layer 130 is formed by depositing a barrier layer composition onto one surface of the polarizer 110 and attaching a process film thereto, followed by curing the barrier layer composition and peeling the process film therefrom. The process film is essentially used to protect the barrier layer composition while preventing contamination of the barrier layer composition. The process film may be a non-stretched or stretched polypropylene film or polyethylene terephthalate film, preferably a polyethylene terephthalate film. The barrier layer 130 is formed of the barrier layer composition, which has low peel strength with respect to the process film after curing to allow easy peeling of the process film and can prevent generation of cracks in the polarizer upon peeling of the process film, thereby improving durability and processability of the polarizing plate. Specifically, the barrier layer 130 may have a peel strength of about 40 gf/25 mm or less with respect to the process film. For example, the barrier layer 130 may have a peel strength of about 10 gf/25 mm to about 40 gf/25 mm, or about 10 gf/25 mm to about 30 gf/25 mm. Within this range, the barrier layer can prevent generation of fine cracks upon peeling of the process film while improving durability and processability of the polarizing plate.

The barrier layer 130 is formed on one surface of the polarizer 110 to be disposed at an opposite side with respect to the protective film 120 and protects the polarizer 110 while blocking permeation of external moisture into the polarizer 110, thereby improving durability of the polarizing plate 100 under high temperature and high humidity conditions.

The barrier layer 130 is formed immediately under the polarizer 110, exhibits good adherence to the polarizer 110, and provides good durability without a separate protective film between the polarizer 110 and the adhesive layer 140, thereby enabling reduction in thickness of the polarizing plate 100.

The barrier layer 130 may be formed on the other surface of the polarizer 110 at an opposite side of the protective film 120 to suppress warpage of the polarizing plate 100. Specifically, a thickness ratio of the protective film to the barrier layer may range from about 5:1 to about 100:1. Specifically, the thickness ratio of the protective film to the barrier layer may range from about 10:1 to about 50:1, more specifically from about 10:1 to about 30:1. Within this thickness range, warpage of the polarizing plate can be suppressed.

The barrier layer 130 may have a thickness of about 20 µm or less, specifically about 1 µm to about 15 more specifically about 2 µm to about 10 for example, about 2 µm to about 5 Within this range, the barrier layer can be used in the polarizing plate and has a suitable thickness, as compared to the protective film, thereby suppressing warpage of the polarizing plate while improving the barrier effects thereof.

The barrier layer 130 may have a glass transition temperature of about 90° C. or more, for example, about 90° C. to about 150° C., or about 90° C. to about 120° C. Within this range, the barrier layer exhibits good adherence to the polarizer and exhibits less variation in modulus due to temperature change to suppress shrinkage/expansion of the polarizer.

The barrier layer 130 has a yellow index of about 1.0 or less, for example, about 0.1 to about 1.0. Within this range, the barrier layer does not exhibit a yellow color and thus can be used in the polarizing plate.

The barrier layer 130 is formed of a barrier layer composition including an epoxy compound and a sulfonium antimony-based initiator, and may be formed by curing through actinic radiation including UV radiation, electron beams, and the like. The barrier layer composition may further include a (meth)acrylate compound. The total of the epoxy compound and the (meth)acrylate compound constitute a curable component.

The epoxy compound may include at least one of an alicyclic epoxy compound, an aromatic epoxy compound, and an aliphatic epoxy compound.

In one embodiment, the epoxy compound may be an alicyclic epoxy compound alone.

In another embodiment, the epoxy compound may include a mixture of an alicyclic epoxy compound and at least one of an aliphatic epoxy compound and an aromatic epoxy compound. For example, the epoxy compound may include a mixture of a bifunctional alicyclic epoxy compound and a bifunctional aliphatic epoxy compound. For example, the epoxy compound may include a mixture of a bifunctional alicyclic epoxy compound and a monofunctional aromatic epoxy compound.

The alicyclic epoxy compound may have a glass transition temperature of about 180° C. in a homopolymer phase, for example, about 180° C. to about 200° C. As such, the alicyclic epoxy compound is an epoxy compound having a high glass transition temperature and can improve crack resistance and adherence to the polarizer.

The alicyclic epoxy compound may include at least one selected from among 3,4-epoxycyclohexylmethyl-3',4'-epoxycyclohexanecarboxylate, 2-(3,4-epoxycyclohexyl-5,5-Spiro-3,4-epoxy)cyclohexane-meta-dioxane, bis(3,4-epoxycyclohexylmethyl)adipate, bis(3,4-epoxy-6-methylcyclohexyl)adipate, 3,4-epoxy-6-methylcyclohexyl-3',4'-epoxy-6'-methylcyclohexanecarboxylate, ε-caprolactone modified 3,4-epoxycyclohexylmethyl-3',4'-epoxycyclohexanecarboxylate, trimethylcaprolactone modified 3,4-epoxycyclohexylmethyl-3',4'-epoxycyclohexanecarboxylate, β-methyl-δ-valerolactone modified 3,4-epoxycyclohexylmethyl-3',4'-epoxycyclohexanecarboxylate, methylene bis(3,4-epoxycyclohexane), di(3,4-epoxycyclohexylmethyl)ether of ethylene glycol, ethylene bis(3,4-epoxycyclohexanecarboxylate), epoxycyclohexahydrophthalic acid dioctyl, and epoxycyclohexahydrophthalic acid di-2-ethylhexyl. As the alicyclic epoxy compound, CELLOXIDE 2021P (DAICEL Co., Ltd.) may be used, without being limited thereto.

The alicyclic epoxy compound may be present in an amount of about 40 wt % to about 90 wt % in the curable component of the barrier layer composition in terms of solid content. Specifically, the alicyclic epoxy compound may be present in an amount of about 50 wt % to about 90 wt %, or about 50 wt % to about 85 wt %. Within this range, the barrier layer composition can exhibit good adherence to the polarizer and has low viscosity to provide good coatability.

The alicyclic epoxy compound may be present in an amount of about 70 wt % to about 100 wt %, specifically about 70 wt % to about 90 wt %, or about 100 wt % in the epoxy composition in terms of solid content. Within this range, the barrier layer composition has a high glass transition temperature to provide the barrier effects.

The aliphatic epoxy compound may be used as a diluent solvent to prevent deterioration in coatability due to high viscosity of the alicyclic epoxy compound. The aliphatic epoxy compound may include at least one selected from among a monofunctional aliphatic epoxy compound and a bifunctional aliphatic epoxy compound. The monofunctional aliphatic epoxy compound may include at least one selected from among ethyl glycidyl ether, butyl glycidyl ether, hexyl glycidyl ether, octyl glycidyl ether, 2-ethylhexyl glycidyl ether, dodecyl glycidyl ether, and octadecyl glycidyl ether. The bifunctional aliphatic epoxy compound may include at least one selected from among 1,4-butanediol-diglycidyl ether, 1,6-hexanedioldiglycidyl ether, neopentyl glycol diglycidyl ether, trimethylolpropane triglycidyl ether, polyethylene glycol diglycidyl ether, polypropylene glycol diglycidyl ethers; diglycidyl ethers of polyetherpolyol obtained by adding at least one kind of alkylene oxide to an aliphatic polyvalent alcohol, such as ethylene glycol, propylene glycol, glycerin, and the like; diglycidyl esters of aliphatic long-chain dibasic acids; diglycidyl ethers of an aliphatic higher alcohol; and diglycidyl ethers of a higher fatty acid. The aliphatic epoxy compound may further include a tri or higher-functional aliphatic epoxy compound. Preferably, the aliphatic epoxy compound may be a bifunctional aliphatic epoxy compound.

The aliphatic epoxy compound may be optionally present in an amount of about 60 wt % or less, specifically about 5 wt % to about 50 wt %, about 5 wt % to about 40 wt %, about 15 wt % to about 50 wt %, about 10 wt % to about 60 wt %, about 10 wt % to about 50 wt %, or about 10 wt % to about 40 wt %, in the curable component of the barrier layer composition in terms of solid content. Within this range, the barrier layer composition can exhibit good adherence to the polarizer and does not have high viscosity to secure good coatability.

The aromatic epoxy compound may include at least one selected from among monofunctional aromatic epoxy compounds such as phenyl glycidyl ether, cresyl glycidyl ether, and the like, bisphenol A, F, and phenol novolac, cresol novolac, bisphenol A-novolac, dichloropentadiene novolac, glycidyl ether of triphenolmethane, triglycidyl-p-aminophenol, and tetraglycidyl methylenedianiline. Preferably, the aromatic epoxy compound is the monofunctional aromatic epoxy compound.

The aromatic epoxy compound may be optionally present in an amount of about 30 wt % or less, about 1 wt % to about 30 wt %, specifically about 1 wt % to about 20 wt %, in the curable component of the barrier layer composition in terms of solid content. Within this range, the barrier layer composition can exhibit good adherence to the polarizer and does not have high viscosity to secure good coatability.

The epoxy compound may be present in an amount of about 40 wt % to about 100 wt %, specifically about 40 wt % to about 90 wt %, about 50 wt % to about 85 wt %, about 60 wt % to about 90 wt %, or about 100 wt %, in the curable component of the barrier layer composition in terms of solid content. Within this range, the barrier layer composition can exhibit good adherence to the polarizer and does not have high viscosity to secure good coatability.

In the barrier layer composition, the (meth)acrylate compound can reduce viscosity of the barrier layer composition to improve coatability of the barrier layer composition, can increase hardness of the barrier layer, and can promote curing of the barrier layer composition. The (meth)acrylate compound can be reacted by radicals initiated by photo-energy.

The (meth)acrylate compound may include at least one selected from among a hydrophilic (meth)acrylate and a hydrophobic (meth)acrylate.

The hydrophilic (meth)acrylate is a (meth)acrylate having a hydroxyl group as a hydrophilic group and is polymerized by radicals initiated by photo-energy to stably react by photo-energy without suffering from inhibition of reaction by moisture of the polarizer. The hydrophilic (meth)acrylate may include a (meth)acrylate containing a $C_1$ to $C_{10}$ alkyl group having at least one hydroxyl group. The hydrophilic (meth)acrylate may have a monofunctional group or a bi- or higher functional group. For example, the hydrophilic (meth)acrylate may include at least one selected from among 2-hydroxyethyl (meth)acrylate, 2- or 3-hydroxypropyl (meth)acrylate, 2-hydroxybutyl (meth)acrylate, 4-hydroxybutyl (meth)acrylate, and 2-hydroxy-3-phenoxypropyl (meth)acrylate.

The hydrophilic (meth)acrylate may be optionally present in an amount of about 60 wt % or less, specifically about 1 wt % to about 40 wt %, about 10 wt % to about 60 wt %, about 10 wt % to about 50 wt %, about 15 wt % to about 50 wt %, or about 10 wt % to about 40 wt %, in the curable component of the barrier layer composition in terms of solid content. Within this range, the barrier layer composition can improve adherence between the polarizer and the barrier layer.

The hydrophobic (meth)acrylate may include other (meth)acrylates in addition to the hydrophilic (meth)acrylate. The hydrophobic (meth)acrylate may include a monofunctional (meth)acrylic compound having one (meth)acryloxy group, a bifunctional (meth)acrylic compound having two (meth)acryloxy groups, an oligomer thereof, or a mixture thereof.

The monofunctional (meth)acrylic compound may include a (meth)acrylate having an unsubstituted $C_1$ to $C_{10}$ alkyl group, a (meth)acrylate having a $C_3$ to $C_{10}$ alicyclic group, a (meth)acrylate having a $C_6$ to $C_{20}$ aryl group, or a (meth)acrylate having a $C_7$ to $C_{20}$ arylalkyl group. Specifically, the monofunctional (meth)acrylic compound may include at least one selected from among t-butyl (meth)acrylate, isobutyl (meth)acrylate, 2-ethylhexyl (meth)acrylate, phenoxyethyl (meth)acrylate, cyclohexyl (meth)acrylate, isobornyl (meth)acrylate, and benzyl (meth)acrylate. In addition, the monofunctional (meth)acrylic compound may include at least one selected from among tetrahydrofurfuryl (meth)acrylate, phenoxyethyl (meth)acrylate, dicyclopentenyloxyethyl (meth)acrylate, dimethylaminoethyl (meth)acrylate, ethylcarbitol (meth)acrylate, tritrimethylolpropane mono(meth)acrylate, pentaerythritol mono(meth)acrylate, and phenoxypolyethylene glycol mono(meth)acrylate.

The bifunctional (meth)acrylic compound may include at least one selected from among unsubstituted alkylene glycol di(meth)acrylates, polyoxyalkylene glycol di(meth)acrylates, halogenated alkylene glycol di(meth)acrylates, di(meth)acrylates of aliphatic polyols, di(meth)acrylate s of hydrogenated dicyclopentadiene or tricyclodecane dialkanol, di(meth)acrylates of dioxane glycol or dioxane dialkanol, di(meth)acrylates of bisphenol A or bisphenol F with alkylene oxide adducts, and epoxy di(meth)acrylates of bisphenol A or bisphenol F. Specifically, the bifunctional (meth)acrylic compound may include at least one selected from among ethylene glycol di(meth)acrylate, 1,3-butanediol di(meth)acrylate, 1,4-butanediol di(meth)acrylate, 1,6-hexanediol di(meth)acrylate, 1,9-nonandiol di(meth)acrylate, neopentyl glycol di(meth)acrylate, tritrimethylol propane di(meth)acrylate, pentaerythritol di(meth)acrylate, ditritrimethylol propane di(meth)acrylate, diethylene glycol di(meth)acrylate, triethylene glycol di(meth)acrylate, dipropylene glycol di(meth)acrylate, tripropylene glycol di(meth)acrylate, polyethylene glycol di(meth)acrylate, polypropylene glycol di(meth)acrylate, polytetramethylene glycol di(meth)acrylate, silicone di(meth)acrylate, hydroxypivalate ester neopentyl glycol di(meth)acrylate, 2,2-bis[4-(meth)acryloyloxyethoxyethoxyphenyl]propane, 2,2-bis[4-(meth)acryloyloxyethoxyethoxycyclohexyl]propane, hydrogenated dicyclopentadienyl di(meth)acrylate, tricyclodecanedimethanol di(meth)acrylate, 1,3-dioxane-2,5-diyl di(meth)acrylate, and tris(hydroxyethyl)isocyanurate di(meth)acrylate.

The hydrophobic (meth)acrylate may be optionally present in an amount of about 30 wt % or less, specifically about 0.1 wt % to about 30 wt %, more specifically about 0.1 wt % to about 10 wt %, in the curable component of the barrier layer composition in terms of solid content. Within this range, the barrier layer composition can improve adherence between the polarizer and the barrier layer.

The (meth)acrylate compound may be optionally present in an amount of about 60 wt % or less, specifically about 10 wt % to about 60 wt %, about 15 wt % to about 50 wt %, or about 10 wt % to about 40 wt %, in the curable component of the barrier layer composition in terms of solid content. Within this range, the barrier layer composition can exhibit good adherence to the polarizer and does not have high viscosity to secure good coatability.

In a total of 100 wt % of the epoxy compound and the (meth)acrylate compound, the epoxy compound and the (meth)acrylate compound may be present in a weight ratio of about 60 wt % to about 90 wt %:about 10 wt % to about 40 wt % (epoxy compound:(meth)acrylate compound). Within this range, the barrier layer composition can secure a high glass transition temperature of the barrier layer to provide the barrier effects while maintaining low viscosity for good coatability.

In one embodiment, the barrier layer composition may include a bifunctional alicyclic epoxy compound; and at least one selected from among a monofunctional aromatic epoxy compound, a bifunctional aliphatic epoxy compound and a (meth)acrylate compound. Here, the bifunctional alicyclic epoxy compound and at least one selected from among the monofunctional aromatic epoxy compound, the bifunctional aliphatic epoxy compound and the (meth)acrylate compound may be present in a weight ratio of about 60 wt % to about 90 wt %:about 10 wt % to about 40 wt %. Within this range, the barrier layer composition can secure a high glass transition temperature of the barrier layer to provide barrier effects while maintaining low viscosity for good coatability.

The sulfonium antimony-based initiator can cure the curable component.

The sulfonium antimony-based initiator may be included in the epoxy compound or in the mixture of the epoxy compound and the (meth)acrylate compound to cure the curable component without use of a thioxanthone photoenhancer, thereby enabling formation of a barrier layer not suffering from a yellowing phenomenon. The sulfonium antimony-based initiator may be included in the epoxy compound or in the mixture of the epoxy compound and the (meth)acrylate compound to improve adherence to the polarizer, thereby preventing generation of cracks in the barrier layer due to thermal impact. As in examples described below, the degree of crack generation in the polarizer can be different according to adherence to the polarizer even under the same thermal impact conditions. In addition, the sulfonium antimony-based initiator may be included in the epoxy compound or in the mixture of the epoxy compound and the (meth)acrylate compound to allow the barrier layer composition to exhibit low peel strength with respect to a process film after curing so as to allow the process film to be easily peeled off, thereby suppressing crack generation upon peeling.

The sulfonium antimony-based initiator is a photo-cationic initiator and is composed of sulfonium-containing cations and antimony-containing anions. Examples of the cations may include triarylsulfonium such as triphenylsulfonium, diphenyl-4-thiophenoxyphenylsulfonium, and diphenyl-4-phenylthiophenyl sulfonium, bis[4-(diphenylsulfonio)phenyl]sulfide, and the like. Examples of the anions may include hexafluoroantimonate ($SbF_6^-$), hexachloroantimonate ($SbCl_6^-$), and the like. Preferably, the sulfonium antimony-based initiator is diphenyl-4-phenylthiophenyl sulfonium hexafluoroantimonate.

The sulfonium antimony-based initiator may be present in an amount of about 0.1 parts by weight to about 10 parts by weight relative to a total of 100 parts by weight of curable components of the barrier layer composition in terms of solid content. Specifically, the sulfonium antimony-based initiator may be present in an amount of about 0.5 parts by weight to about 5 parts by weight, for example, about 0.5 parts by weight to about 3 parts by weight. Within this range, the initiator can permit sufficient curing of the curable components, can prevent deterioration in transparency of the barrier layer due to remaining initiator, and can prevent generation of cracks in the polarizer.

The barrier layer composition may further include a photo-radical initiator. The photo-radical initiator may further increase the curing rate of the (meth)acrylate compound. The photo-radical initiator may include at least one selected from among phosphorus, triazine, acetophenone, benzophenone, benzoin, oxime, and phenylketone initiators. The photo-radical initiator may be present in an amount of about 0.1 parts by weight to about 10 parts by weight relative to a total of 100 parts by weight of the curable components of the barrier layer composition in terms of solid content. Specifically, the photo-radical initiator may be present in an amount of about 1 part by weight to about 6 parts by weight. Within this range, the initiator can permit sufficient curing of the curable components and can prevent deterioration in transparency of the barrier layer due to remaining initiator.

The barrier layer composition may be a solvent-free composition or may further include a solvent to improve coatability, applicability or processability. The solvent may include methylethylketone, methylisobutylketone, and propylene glycol monomethylether acetate, without being limited thereto.

The barrier layer composition may further include additives. The additives can provide additional functions to the barrier layer. Specifically, the additives may include at least one selected from among a UV absorbent, a reaction inhibitor, an adhesion enhancer, a thixotropic agent, a conductivity imparting agent, a color regulator, a stabilizer, an antistatic agent, an antioxidant, and a leveling agent, without being limited thereto.

The barrier layer composition may further include fine particles to further improve hardness and mechanical strength of the barrier layer. Specifically, the fine particles include hygroscopic fine particles to further improve a moisture blocking effect of the barrier layer. The fine particles may include at least one of silica, aluminum oxide, zirconium oxide, and titanium oxide, without being limited thereto. The fine particles may be partly or entirely subjected to surface treatment with an epoxy group, a (meth)acrylate group or a vinyl group to improve compatibility. The fine particles may have any shape and any size without being particularly limited. Specifically, the fine particles may include spherical particles, flake particles, amorphous particles, and the like. The fine particles may have an average particle size of about 1 nm to about 200 nm, specifically about 8 nm to about 50 nm. Within this range, the fine particles can increase hardness of the barrier layer without affecting surface roughness and transparency of the barrier layer. The fine particles may be present in an amount of about 3 wt % to about 30 wt %, specifically about 5 wt % to about 20 wt %, in the barrier layer composition. Within this range, the fine particles can increase hardness of the barrier layer without affecting surface roughness and transparency of the barrier layer.

The barrier layer composition may have a viscosity at 25° C. of about 5 cP to about 200 cP, specifically about 10 cP to about 150 cP. Within this range, the barrier layer composition can easily form the barrier layer.

The polarizer 110 is formed between the barrier layer 130 and the adhesive layer 140 to polarize external light entering the polarizing plate 100.

The polarizer 110 may include a polarizer formed of a polyvinyl alcohol film. In one embodiment, the polarizer may include a polyvinyl alcohol film dyed with at least one of iodine or a dichroic dye, or a polyene-based polarizer obtained through dehydration of the polyvinyl alcohol film. The polyvinyl alcohol film may have a saponification degree of about 85 mol % to about 100 mol %, specifically about 98 mol % to about 100 mol %. The polyvinyl alcohol film may have a polymerization degree of about 1,000 to about 10,000, specifically about 1,500 to about 10,000. The polyvinyl alcohol film may have a thickness of about 50 μm to about 200 μm. Within these ranges of saponification degree, polymerization degree and thickness, the polarizer may be manufactured. Specifically, the polyvinyl alcohol-based polarizer may be manufactured by dyeing the polyvinyl alcohol film with at least one of iodine or the dichroic dye, followed by mono-axially stretching the polyvinyl alcohol film to a final elongation ratio of 2 times to 8 times, specifically 3 times to 6 times, an initial length thereof in the machine direction (MD). Stretching may include dry stretching, wet stretching, or a combination thereof. Herein, the "final elongation ratio" means a ratio of a final length of the polyvinyl alcohol-based polarizer to an initial length of the polyvinyl alcohol film. The polyvinyl alcohol-based polarizer may be dipped in a boric acid solution or in a potassium iodide solution for color correction after stretching. Specifically, the polyene-based polarizer may be manufactured by coating an acid catalyst onto the polyvinyl alcohol film for dehydration, followed by drying. The acid catalyst may include an organic acid including an aromatic sulfonic acid, such as toluene sulfonic acid including p-toluene sulfonic acid and the like, an inorganic acid, or a mixture thereof.

The polarizer 110 may have a thickness of about 5 µm to about 100 µm, specifically about 5 µm to about 50 µm. Within this range, the polarizer can be used in the polarizing plate.

The protective film 120 is formed on one surface of the polarizer 110 to protect the polarizer 110. The protective film 120 may be formed on the one surface of the polarizer 110 via a bonding layer 130.

The protective film 120 has good moisture permeation resistance and may have a degree of moisture permeation of about 30 g/m$^2$·24 hr or less, specifically about 1 g/m$^2$·24 hr to about 25 g/m$^2$·24 hr, more specifically about 5 g/m$^2$·24 hr to about 15 g/m$^2$·24 hr. Within this range, the protective film can block external moisture from entering the polarizer, thereby improving durability of the polarizing plate under high temperature/humidity conditions.

In one embodiment, the protective film 120 may have an in-plane retardation (Re) of about 5,000 nm or more, specifically about 5,000 nm to about 15,000 nm, at a wavelength of 550 nm, as calculated by Equation 1. More specifically, the protective film 120 has an in-plane retardation (Re) of about 6,000 nm to about 12,000 nm. Within this range, the polarizing plate can prevent generation of rainbow spots.

$$Re=(nx-ny)\times d, \quad \text{<Equation 1>}$$

where nx and ny are the indices of refraction of the protective film in the x-axis and y-axis directions thereof at a wavelength of 550 nm, respectively, and d is the thickness of the protective film (unit: nm).

The protective film 120 may have a degree of biaxiality (NZ) of about 1.8 or less, specifically about 1.0 to about 1.8, at a wavelength of 550 nm, as calculated by Equation 2, and an out-of-plane retardation (Rth) of 15,000 nm or less, specifically 6,000 nm to 12,000 nm, at a wavelength of 550 nm, as calculated by Equation 3. Within this range, the polarizing plate can prevent generation of rainbow spots due to birefringence.

$$NZ=(nx-nz)/(nx-ny) \quad \text{<Equation 2>}$$

$$Rth=((nx+ny)/2-nz)\times d \quad \text{<Equation 3>}$$

where nx, ny and nz are the indices of refraction of the protective film at a wavelength of 550 nm in the x-axis, y-axis and z-axis directions of the protective film, and d is the thickness of the protective film (unit: nm).

In another embodiment, the protective film 120 may have an in-plane retardation (Re) of about 500 nm or less, for example, about 350 nm or less, at a wavelength of 550 nm, as calculated by Equation 1. The protective film 120 may have a degree of biaxiality (NZ) of about 10 or more, for example, about 15 or more, at a wavelength of 550 nm, as calculated by Equation 2. The protective film 120 may have an out-of-plane retardation (Rth) of about 6,000 nm or more, for example, about 6,500 nm or more, at a wavelength of 550 nm, as calculated by Equation 3.

The protective film 120 may be formed of a polyester resin and may include an optically transparent film. Specifically, the polyester resin may include at least one selected from among polyethylene terephthalate, polyethylene naphthalate, polybutylene terephthalate, and polybutylene naphthalate, without being limited thereto. In one embodiment, the protective film 120 may be formed of one kind of polyester resin and may be composed of a single layer. The protective film 120 composed of a single layer has the degree of moisture permeation as described above, thereby improving durability of the polarizing plate under high temperature/humidity conditions.

The protective film 120 has a thickness of about 5 µm to about 200 specifically about 10 µm to about 150 more specifically about 50 µm to about 120 Within this range, the protective film can be used in the polarizing plate and can suppress warpage of the polarizing plate together with the barrier layer.

The protective film 120 may further include typical additives in addition to the resin for the protective film. Specifically, the additives may include a UV absorbent, a leveling agent, an antistatic agent, and the like. The UV absorbent may include a typical UV absorbent capable of absorbing light having a wavelength of 200 nm to 400 nm. Specifically, the UV absorbent may include at least one selected from among phenol, benzotriazole, salicylic acid, triazine and oxamide UV absorbents.

The protective film 120 is a film uniaxially stretched in the TD or a film biaxially stretched in the TD and the MD, and the polarizer 110 is a film uniaxially stretched in the MD, as described above. In the polarizing plate 100, the TD of the protective film 120 may be substantially orthogonal to the MD of the polarizer 110. As a result, it is possible to prevent warpage of the polarizing plate 100. Herein, the expression "substantially orthogonal" may include a structure wherein the TD of the protective layer is orthogonal to the MD of the polarizer not only at an angle of 90° but also at a certain angle within an acceptable margin from 90°.

Although not shown in FIG. 1, the protective film 120 further includes a functional coating layer on one surface thereof to provide additional functions to the polarizing plate. Specifically, the functional coating layer may include at least one selected from among a hard coating layer, an anti-reflection layer, an anti-fingerprint layer, an antistatic layer, and a low reflectivity layer, without being limited thereto. The functional coating layer may have a thickness of about 1 µm to about 100 µm, specifically about 1 µm to about 50 µm, more specifically about 1 µm to about 20 µm. Within this thickness range, the functional coating layer can provide additional functions to the polarizing plate without affecting the protective film and can be used in the polarizing plate.

Although not shown in FIG. 1, the protective layer 120 may further include a primer layer on the other surface of the protective layer 120 to allow further improved bonding between the polarizer 110 and the protective layer 120 via the bonding layer 140. The primer layer may become a hydrophilic surface modification layer. The primer layer may be formed by coating a composition including a resin for the primer layer having both a hydrophilic group and a hydrophobic group. For example, the resin for the primer layer may include at least one of a polyester resin and a polyvinyl acetate resin. The primer layer may have a thickness of about 1 nm to about 100 nm, specifically about 1 nm to about 50 nm, more specifically about 1 nm to about 20 nm. Within this thickness range, the primer layer can secure good adherence to the polarizer and high total light transmittance.

The adhesive layer 140 attaches the polarizing plate 100 to a liquid crystal panel, an organic light emitting panel, and the like.

The adhesive layer 140 may have a modulus of about 0.1 MPa or less at 23° C., specifically about 0.001 MPa to about 0.1 MPa. Within this range, the adhesive layer can minimize warpage of the polarizing plate upon stacking the protective layer, the polarizer and the barrier layer, and can relieve stress of the polarizer, thereby providing good crack resistance.

The adhesive layer 140 may have a thickness of about 5 μm to 40 μm, specifically about 10 μm to 30 μm. Within this range, the adhesive layer can be used in the polarizing plate.

The adhesive layer 140 may be formed of an adhesive layer composition, which includes a (meth)acrylic copolymer and a crosslinking agent. The adhesive layer composition may include a (meth)acrylic copolymer of a monomer mixture including an alkyl group-containing (meth)acrylic monomer and a hydroxyl group-containing (meth)acrylic monomer, and a crosslinking agent. The alkyl group-containing (meth)acrylic monomer may include an unsubstituted $C_1$ to $C_{20}$ alkyl group-containing (meth)acrylic acid ester. Specifically, the alkyl group-containing (meth)acrylic monomer may include at least one selected from among methyl (meth)acrylate, N-butyl (meth)acrylate, pentyl (meth)acrylate, and 2-ethylhexyl (meth)acrylate. These may be used alone or in combination thereof. The hydroxyl group-containing (meth)acrylic monomer may include a (meth)acrylic acid ester containing a $C_1$ to $C_{20}$ alkyl group having at least one hydroxyl group. Specifically, the hydroxyl group-containing (meth)acrylic monomer may include at least one selected from among 2-hydroxyethyl (meth)acrylate, 3-hydroxypropyl (meth)acrylate, and 4-hydroxybutyl (meth)acrylate. These may be used alone or in combination thereof.

The monomer mixture may be present in an amount of about 90 parts by weight to about 99 parts by weight of the alkyl group-containing (meth)acrylic monomer and about 1 part by weight to about 10 parts by weight of hydroxyl group-containing (meth)acrylic monomer in terms of solid content. Within this range of monomer mixture, the adhesive composition can exhibit high adhesion with respect to the barrier layer and liquid crystal glass. The crosslinking agent may include a typical isocyanate crosslinking agent. Specifically, the crosslinking agent may include at least one selected from among hexamethylene diisocyanate, toluene diisocyanate, xylene diisocyanate, isophorone diisocyanate, naphthalene diisocyanate, and an adduct of trimethylolpropane-modified toluene diisocyanate. The crosslinking agent may be present in an amount of about 0.1 parts by weight to about 1 part by weight relative to 100 parts by weight of the (meth)acrylic copolymer. Within this range, the adhesive composition can be sufficiently cross-linked, thereby exhibiting adhesive effects. The adhesive composition may further include at least one of a silane coupling agent and a crosslinking catalyst.

The polarizing plate 100 may have a variation ratio of light transmittance of about 3% or less, specifically about 0% to about 3.0%, as calculated by Equation 4. Within this range, the polarizing plate can exhibit good durability under high temperature/humidity conditions and can be used in an optical display.

Variation ratio of light transmittance=$|T_0-T_{500}|/T_0 \times 100$, <Equation 4> where $T_0$ is an initial light transmittance of the polarizing plate at a wavelength of 400 nm to 700 nm and $T_{500}$ is a light transmittance of the polarizing plate at a wavelength of 400 nm to 700 nm, as measured after the polarizing plate is left at 85° C. and 85% RH for 500 hours and then left at 25° C. for 1 hour.

The polarizing plate 100 may have a variation ratio of polarization degree of about 5% or less, specifically about 0% to about 3%, as calculated by Equation 5. Within this range, the polarizing plate can exhibit good durability under high temperature/humidity conditions and can be used in an optical display.

Variation ratio of polarization degree=$|P_0-P_{500}|/P_0 \times 100$ <Equation 5> where $P_0$ is an initial degree of polarization of the polarizing plate and $P_{500}$ is a degree of polarization of the polarizing plate, as measured after the polarizing plate is left at 85° C. and 85% RH for 500 hours and then left at 25° C. for 1 hour.

The polarizing plate 100 may have a thickness of about 150 μm or less, specifically about 140 μm or less, more specifically about 130 μm or less. For example, the polarizing plate 100 may have a thickness of about 50 μm to about 150 μm. Within this range, the polarizing plate can be used in an optical display.

The polarizing plate 100 may have a light transmittance of about 30% or more, specifically about 30% to about 50%, more specifically about 40% to about 50%, at a wavelength of 400 nm to 700 nm.

The polarizing plate 100 may have a degree of polarization of about 90% or more, specifically about 95.000% to about 99.990%. Within these ranges of transmittance and polarization degree, the polarizing plate can be used in the optical display.

Next, a method of manufacturing a polarizing plate according to one embodiment of the present invention will be described.

The method for manufacturing a polarizing plate according to one embodiment of the present invention includes depositing the barrier layer composition onto one surface of a polarizer, followed by attaching a process film thereto; and curing the barrier layer composition to form a barrier layer, followed by peeling the process film from the barrier layer, wherein peel strength between the barrier layer and the process film is about 40 gf/25 mm or less.

The barrier layer composition may be deposited onto the polarizer by a typical deposition method. Specifically, the composition may be deposited by die coating, gravure coating, or the like. Curing may include irradiation with actinic radiation, specifically UV light, at about 100 mW/cm² to about 2,000 mW/cm² and about 100 mJ/cm² to about 1,000 mJ/cm². According to the present invention, the barrier layer has low peel strength with respect to the process film after curing of the barrier layer composition to allow the process film to be easily peeled off, thereby suppressing generation of cracks in the barrier layer upon peeling.

The method may further include depositing a bonding layer composition onto one surface of a protective film and attaching the protective film to the other surface of the polarizer, followed by curing the bonding layer composition. Here, deposition and curing may be performed as in the above description.

The method may further include depositing an adhesive layer composition onto the barrier layer after peeling the process film, followed by aging.

An optical display according to one embodiment of the present invention may include the polarizing plates according to the embodiments of the present invention. The optical display may include a liquid crystal display, and an organic light light emitting diode display, without being limited thereto.

In the liquid crystal display, a liquid crystal panel may include liquid crystals driven in an in-plane switching (IPS) mode, a twist nematic (TN) mode, a vertical alignment (VA) mode, a patterned vertical alignment (PVA) mode, or a super-patterned vertical alignment (S-PVA).

MODE FOR INVENTION

Hereinafter, the present invention will be described in more detail with reference to some examples. It should be understood that these examples are provided for illustration only and are not to be in any way construed as limiting the present invention.

Details of components used in Examples and Comparative Examples are as follows.

(A) Epoxy compound:
(A1) Alicyclic epoxy: 3,4-epoxycyclohexylmethyl-3,4-epoxycyclohexyl carboxylic acid (CELLOXIDE 2021P, Daicel)
(A2) Monofunctional aromatic epoxy: phenyl glycidyl ether (EX-141, Nagase)
(A3) Bifunctional aliphatic epoxy: 1,4-butanediol diglycidyl ether (EX-214L, Nagase)
(B) (Meth)acrylate compound:
(B1) Hydrophilic acrylate: 4-hydroxybutyl acrylate (4HBA, Kojin)
(B2) Hydrophobic acrylate: 2-phenoxyethyl acrylate (M140, Miwon Commercial Co., Ltd.)
(C) Initiator:
(C1) Sulfonium antimony-based initiator (photo-cationic initiator): diphenyl-4-(phenylthio)phenylsulfonium hexafluoroantimonate (CPI-101A, SAN-APRO)
(C2) Iodonium initiator (photo-cationic initiator): (4-methylphenyl)[4-(2-methylpropyl)phenyl]iodonium hexafluorophosphate (Irgacure 250, BASF)
(C3) Sulfonium phosphate initiator (photo-cationic initiator): Diphenyl-4-(phenylthio)phenyl sulfonium hexafluorophosphate (CPI-100P, SAN-APRO)
(C4) Photo-radical initiator: Irgacure-184 (BASF)
(D) Photo-enhancer: 2,4-diethylthioxanthone (DETX-s, Nipponkayaku) as a thioxanthone photo-enhancer
(E) Process film
PET process film: XD510P (Toray Advanced Materials)
(F) Protective film: polyethylene terephthalate film (thickness: 80 μm)

Example 1

(1) Preparation of Polarizer
A polyvinyl alcohol film (saponification degree: 99.5 mol %, polarization degree: 2,000, thickness: 80 μm) was dipped and dyed in a 0.3% iodine solution. The dyed film was mono-axially stretched to a length of 5.0 times an initial length thereof. The stretched polyvinyl alcohol film was dipped in a 3% boric acid solution and a 2% potassium iodide solution for color correction. Then, the polyvinyl alcohol film was dried at 50° C. for 4 minutes, thereby providing a 23 μm thick polarizer.

(2) Preparation of Barrier Layer Composition
An epoxy compound, a (meth)acrylate compound, and a photo-initiator were weighed as listed in Table 1 and mixed to prepare a barrier layer composition.

(3) Preparation of Polarizing Plate
A polarizing plate was prepared under conditions of 22° C. to 25° C. and 20% RH to 60% RH. The prepared bonding layer composition was deposited onto one surface of the protective film to form a bonding layer, which in turn was bonded to one surface of the polarizer. The prepared barrier layer composition was deposited onto the other surface of the polarizer, followed by attaching a process film to the barrier layer composition. Here, the bonding layer composition was a photo-curable bonding layer composition including an epoxy compound, a (meth)acrylate compound, and an initiator.

The barrier layer composition was irradiated with UV light at 400 mW/cm$^2$ and 1,000 mJ/cm$^2$ using a metal halide lamp, followed by removing the process film. An adhesive layer composition was deposited onto one surface of the barrier layer, from which the process film was removed, followed by aging, thereby preparing a polarizing plate in which an adhesive layer (thickness: 25 μm), a barrier layer (thickness: 3 μm), a polarizer (thickness: 23 μm), a bonding layer (thickness: 3 μm), and a protective film (thickness: 80 μm) are sequentially stacked in the stated order. The adhesive layer composition comprises an acrylic copolymer comprising 99 parts by weight of butyl acrylate and 1 part by weight of 4-hydroxybutyl acrylate, and an initiator.

Examples 2 and 3

Each polarizing plate was prepared in the same manner as in Example 1 except that the components and/or the contents of the barrier layer composition were changed as listed in Table 1.

Comparative Examples 1 to 6

Each polarizing plate was prepared in the same manner as in Example 1 except that the components and/or the contents of the barrier layer composition were changed as listed in Table 1.

Components of the polarizing plates prepared in Examples and Comparative Examples are shown in Table 1.

TABLE 1

| Unit: Parts by weight | (A) | | | (B) | | (C) | | | | (D) |
|---|---|---|---|---|---|---|---|---|---|---|
| | (A1) | (A2) | (A3) | (B1) | (B2) | (C1) | (C2) | (C3) | (C4) | (D) |
| Example 1 | 70 | 10 | — | 10 | 10 | 1 | — | — | 1 | — |
| Example 2 | 70 | — | 30 | — | — | 1 | — | — | — | — |
| Example 3 | 70 | — | — | 30 | — | 1 | — | — | 1 | — |
| Comparative Example 1 | 70 | 10 | — | 10 | 10 | — | 4 | — | 1 | 1 |
| Comparative Example 2 | 70 | — | 30 | — | — | — | — | 6 | — | — |

TABLE 1-continued

| Unit: Parts by weight | (A) | | | (B) | | (C) | | | | (D) |
|---|---|---|---|---|---|---|---|---|---|---|
| | (A1) | (A2) | (A3) | (B1) | (B2) | (C1) | (C2) | (C3) | (C4) | |
| Comparative Example 3 | 70 | — | — | 30 | — | — | — | 6 | 1 | — |
| Comparative Example 4 | 70 | 10 | — | 10 | 10 | — | 1 | — | 1 | 1 |
| Comparative Example 5 | 70 | — | 30 | — | — | — | — | 1 | — | — |
| Comparative Example 6 | 70 | — | — | 30 | — | — | — | 1 | 1 | — |

The barrier layers and the polarizing plates of Examples and Comparative Examples were evaluated as to the properties of Table 2.

(1) Adherence: A cutter was inserted at a tip thereof between a barrier layer and a polarizer at one end of a polarizing plate. A polarizing plate not allowing insertion of the tip of the cutter between the barrier layer and the polarizer was rated as ⊚; a polarizing plate allowing slight insertion of the tip of the cutter therebetween was rated as O; a polarizing plate, in which the barrier layer was torn due to certain strength thereof despite slight insertion of the tip of the cutter between the barrier layer and the polarizer during insertion of the cutter was rated as A; and the polarizing plate allowing easy insertion of the tip of the cutter was rated as X.

(2) Peel strength: The prepared bonding layer composition was coated onto one surface of a protective film and bonded to one surface of the prepared polarizer. In addition, the prepared barrier layer composition was coated onto the other surface of the polarizer and attached to the process film. The resulting product was irradiated with UV light at 400 mW/cm² and 1,000 mJ/cm² using a metal halide lamp, thereby preparing a specimen. The specimen was cut to a size of 25 mm×150 mm (TD of the polarizer×MD of the polarizer) to prepare a sample for measurement of peel strength. The polarizer bonded to the protective film and the process film were connected to upper and lower jigs of a tensile tester (Texture Analyzer), and peel strength was measured at 25° C. under a load cell of 30 kgf upon peeling at a rate of 5 mm/sec.

(3) Glass transition temperature (Tg): Each of the barrier layer compositions prepared in Examples and Comparative Examples was irradiated with UV light at 400 mW/cm² and 1,000 mJ/cm² using a metal halide lamp, thereby preparing a specimen having a thickness of 5 μm to 10 μm. For the prepared specimen, tan δ according to temperature was measured using a dynamic mechanical analyzer (DMA) while raising temperature at a temperature elevation rate of 5° C./min. Among tan δ values according to temperature, a temperature providing the highest tan δ was defined as a glass transition temperature.

(4) Yellow index: Yellow index is a value measured in accordance with ASTM D1925. Each of the barrier layer compositions prepared in Examples and Comparative Examples and disposed between release films (for example, cycloolefin film) was irradiated with UV light at 400 mW/cm² and 1,000 mJ/cm² using a metal halide lamp to form a 10 μm thick layer, which in turn was measured as to yellow index using a colorimeter (CM3600A, KONICA-MINOLTA) in a transmission mode at 25° C.

(5) Crack resistance: Crack resistance of a polarizing plate was evaluated under thermal impact conditions. The polarizing plate was cut to a size of 50 mm×50 mm (length×width), followed by lamination onto a glass sheet, thereby preparing a specimen. The specimen was subjected to 250 cycles of heat treatment, in which each cycle included heating the specimen from −40° C. to 85° C. under conditions wherein the specimen was left at −40° C. for 30 minutes before heating and was left at 85° C. for 30 minutes after heating. Cracks generated in the polarizer in the MD were observed with the naked eye in a reflective mode and a backlight mode under a fluorescent lamp. Generation of no crack was rated as O and even slight generation of cracks was rated as X.

TABLE 2

| | Adherence Polarizer surface | Peel strength Process film surface | Tg (° C.) | Yellow index | Crack resistance |
|---|---|---|---|---|---|
| Example 1 | ⊚ | 20 gf/25 mm | 90 | 0.75 | O |
| Example 2 | ⊚ | 30 gf/25 mm | 116 | 0.60 | O |
| Example 3 | ⊚ | 20 gf/25 mm | 95 | 0.65 | O |
| Comparative Example 1 | ⊚ | Peeling impossible | 97 | 1.80 | (Sample could not prepared due to difficulty in peeling) |
| Comparative Example 2 | O | 70 gf/25 mm | 110 | 0.65 | X |
| Comparative Example 3 | O | 80 gf/25 mm | 90 | 0.65 | X |
| Comparative Example 4 | Δ | 50 gf/25 mm | 90 | 1.80 | X |
| Comparative Example 5 | Δ | 50 gf/25 mm | 85 | 0.65 | X |
| Comparative Example 6 | Δ | 50 gf/25 mm | 85 | 0.65 | X |

As shown in Table 2, the polarizing plates according to the present invention exhibited good adherence to the polarizer and good barrier effects and could prevent generation of cracks in the polarizer under thermal impact conditions. In addition, the polarizing plates according to the present invention exhibited low peel strength after curing to allow easy peeling of the process film from the barrier layer, thereby suppressing generation of cracks upon peeling. Further, even without a thioxanthone photo-enhancer, the polarizing plates according to the present invention had a low yellow index, thereby preventing a yellow phenomenon in the barrier layer.

On the contrary, the polarizing plates of Comparative Examples, which were prepared using a composition comprising an iodonium initiator or a sulfonium phosphate initiator, exhibited poor crack resistance and high peel strength with respect to the process film.

It should be understood that various modifications, changes, alterations, and equivalent embodiments can be made by those skilled in the art without departing from the spirit and scope of the present invention.

The invention claimed is:

1. A polarizing plate comprising:
   an adhesive layer, a barrier layer, a polarizer, and a protective film sequentially stacked in the stated order,
   wherein the barrier layer is directly formed on the polarizer and is formed of a barrier layer composition comprising an epoxy compound, a (meth)acrylate compound and a sulfonium antimony-based initiator.

2. The polarizing plate according to claim 1, wherein the barrier layer has a glass transition temperature of about 90° C. or more.

3. The polarizing plate according to claim 1, wherein the barrier layer has a yellow index of about 1.0 or less.

4. The polarizing plate according to claim 1, wherein the sulfonium antimony-based initiator comprises a cation of at least one selected from among triphenylsulfonium, diphenyl-4-thiophenoxyphenylsulfonium and diphenyl-4-phenylthiophenyl sulfonium, and an anion of at least one selected from among hexafluoroantimonate ($SbF_6^-$) and hexachloroantimonate ($SbCl_6^-$).

5. A polarizing plate comprising:
   an adhesive layer, a barrier layer, a polarizer, and a protective film sequentially stacked in the stated order,
   wherein the barrier layer is directly formed on the polarizer and is formed of a barrier layer composition comprising an epoxy compound and a sulfonium antimony-based initiator,
   wherein the epoxy compound comprises a bifunctional alicyclic epoxy compound, and
   the barrier layer composition comprises the bifunctional alicyclic epoxy compound; and at least one of a monofunctional aromatic epoxy compound, a bifunctional aliphatic epoxy compound and a (meth)acrylate compound.

6. The polarizing plate according to claim 5, wherein the bifunctional alicyclic epoxy compound and the at least one of the monofunctional aromatic epoxy compound, the bifunctional aliphatic epoxy compound and the (meth)acrylate compound are present in a weight ratio of about 60 wt % to about 90 wt %:about 10 wt % to about 40 wt % (bifunctional alicyclic epoxy compound:at least one of the monofunctional aromatic epoxy compound, the bifunctional aliphatic epoxy compound and the (meth)acrylate compound), based on a total of 100 parts by weight thereof.

7. The polarizing plate according to claim 1, wherein the barrier layer has a thickness of about 20 μm or less.

8. A method for manufacturing a polarizing plate, comprising:
   depositing a barrier layer composition onto one surface of a polarizer, followed by attaching a process film thereto; and
   curing the barrier layer composition to form a barrier layer, followed by peeling the process film from the barrier layer,
   wherein peel strength between the barrier layer and the process film is about 40 gf/25 mm or less.

9. The method for manufacturing a polarizing plate according to claim 8, wherein the barrier layer composition comprises an epoxy compound and a sulfonium antimony-based initiator.

10. The method for manufacturing a polarizing plate according to claim 8, wherein the barrier layer composition further comprises a (meth)acrylate compound.

11. The method for manufacturing a polarizing plate according to claim 8, wherein the process film comprises a non-stretched or stretched polypropylene film or a non-stretched or stretched polyethylene terephthalate film.

12. The method for manufacturing a polarizing plate according to claim 8, further comprising:
   depositing a bonding layer composition onto one surface of a protective film and attaching the protective film to another surface of the polarizer, followed by curing the bonding layer composition.

13. An optical display comprising the polarizing plate according to claim 1.

* * * * *